United States Patent [19]

Polidan et al.

[11] Patent Number: 5,606,311
[45] Date of Patent: Feb. 25, 1997

[54] AIR FILTER DIAGNOSTIC

[75] Inventors: Jeffrey M. Polidan, Fenton; Dennis P. Stenson, West Bloomfield; Jacqueline A. Jolliffe, Midland, all of Mich.

[73] Assignee: General Motors Corporation, Detroit, Mich.

[21] Appl. No.: 521,254

[22] Filed: Aug. 30, 1995

[51] Int. Cl.⁶ ........................................ G08B 21/00
[52] U.S. Cl. ................................ 340/607; 55/274
[58] Field of Search .................... 340/607, 606, 340/609, 611, 540; 210/85, 90; 55/274; 95/19, 23; 60/276

[56] References Cited

U.S. PATENT DOCUMENTS 3,397,395  8/1968  Pierce ........................................ 340/607

5,425,234  6/1995  Ohuchi et al. ............................ 60/276

*Primary Examiner*—Jeffery Hofsass
*Assistant Examiner*—Sihong Huang
*Attorney, Agent, or Firm*—Michael J. Bridges

[57] ABSTRACT

Significant restriction in an automotive internal combustion engine intake air filter is diagnosed over a wide range of engine operating conditions including low intake airflow rate conditions by qualifying transduced pressure drop across the air filter using airflow rate through the filter. A diagnostic count is maintained and updated in accord with detected significant restriction conditions. Adjustment values applied to the diagnostic count vary in accord with the degree of confidence associated with each detected significant restriction condition, such as indicated by varying engine intake airflow conditions.

13 Claims, 4 Drawing Sheets

5,606,311

AIR FILTER DIAGNOSTIC

FIELD OF THE INVENTION

This invention relates to automotive vehicle service indication and, more particularly, to a method and apparatus for detecting and indicating restricted air filters on automotive vehicles.

BACKGROUND OF THE INVENTION

Maintenance of certain automotive components such as filter components is typically scheduled on an open-loop basis using mileage or time of use to estimate component wear and need for component replacement. The open-loop estimate of wear as a function of mileage or time of use is typically overinclusive, wherein a worst case wear pattern is assumed to preserve automotive vehicle performance under a majority of cases including cases corresponding to worst case component wear. Overinclusive maintenance scheduling is wasteful in that a significant number of vehicles are scheduled to replace components before the components are actually worn out to the point that vehicle performance may be affected.

Closed-loop maintenance scheduling has therefore resulted for many components of automotive vehicles, in which certain engine operating conditions that affect component wear are logged and component wear estimated as a function thereof. For example, air filter monitoring systems have been proposed in which estimate the increase in restrictiveness of air filters for filtering engine intake air. When the restrictiveness reaches a level that may affect engine or vehicle performance, an air filter maintenance request may be made to the vehicle operator, to initiate manual cleaning or replacement of the air filter.

The proposed air filter monitoring systems require the engine to operate at a level corresponding substantially to a maximum intake airflow. Only under such extreme conditions are the monitoring systems able to diagnose the condition of the air filter. Such operating levels rarely occur for automotive vehicles. It may therefore take a significant amount of time of use or a significant amount of mileage before the proposed monitoring systems can diagnose even a highly restricted intake air filter. The proposed monitoring systems may therefore resolve the problem of overinclusive open-loop maintenance scheduling, but at an unacceptable cost of permitting vehicle operation with highly restrictive intake air filters that may substantially affect vehicle performance.

It would therefore be desirable to accurately diagnose restriction in automotive vehicle intake air filters in a timely manner, such as shortly after the filter becomes restriction, such as by monitoring the restriction level through engine operating conditions that occur with a reasonable frequency.

SUMMARY OF THE INVENTION

The present invention provides a desirable automotive vehicle intake air filter monitoring system that diagnoses material restriction rapidly after such restriction occurs. The diagnosis is responsive to vehicle operating conditions frequently present under normal driving conditions.

More specifically, a deterioration condition for an air filter is characterized in accord with a minimum restriction of engine intake air that will not be tolerated. A schedule including one or more pressure drop values paired with a corresponding one or more airflow values is defined for a filter having the deterioration condition. The pressure drop values of the schedule correspond to the minimum pressure drop across a deteriorated air filter when the corresponding airflow is passing through the air filter. Actual pressure drop is transduced and when a minimum pressure drop is determined to be present, airflow through the air filter is sensed. The pressure drop from the schedule is referenced as a function of the sensed airflow and is compared to the transduced actual pressure drop. A restriction condition in the air filter is assumed to be present when the transduced actual pressure drop exceeds the referenced pressure drop.

In a further aspect of this invention, a count of restriction conditions is maintained over a test period, such as over a vehicle ignition cycle. A deteriorated air filter is determined and indicated when the count exceeds a count threshold. In yet a further aspect of this invention, the degree of confidence in the accuracy of any determined restriction condition is estimated and the magnitude of adjustment of the count is dynamically varied as a function of the degree of confidence. In yet a further aspect of this invention, the degree of confidence for any determined restriction condition is varied as a function of airflow through the air filter at the time of the restriction determination. In yet a further aspect of this invention, a steady state engine operating condition in which engine intake air rate is substantially stable is determined and the air filter diagnostic carried out when such steady state condition is present.

BRIEF DESCRIPTION OF THE DRAWINGS

The invention may be best understood by reference to the preferred embodiment and to the drawings in which.

DESCRIPTION OF THE PREFERRED EMBODIMENT

Figure 1:
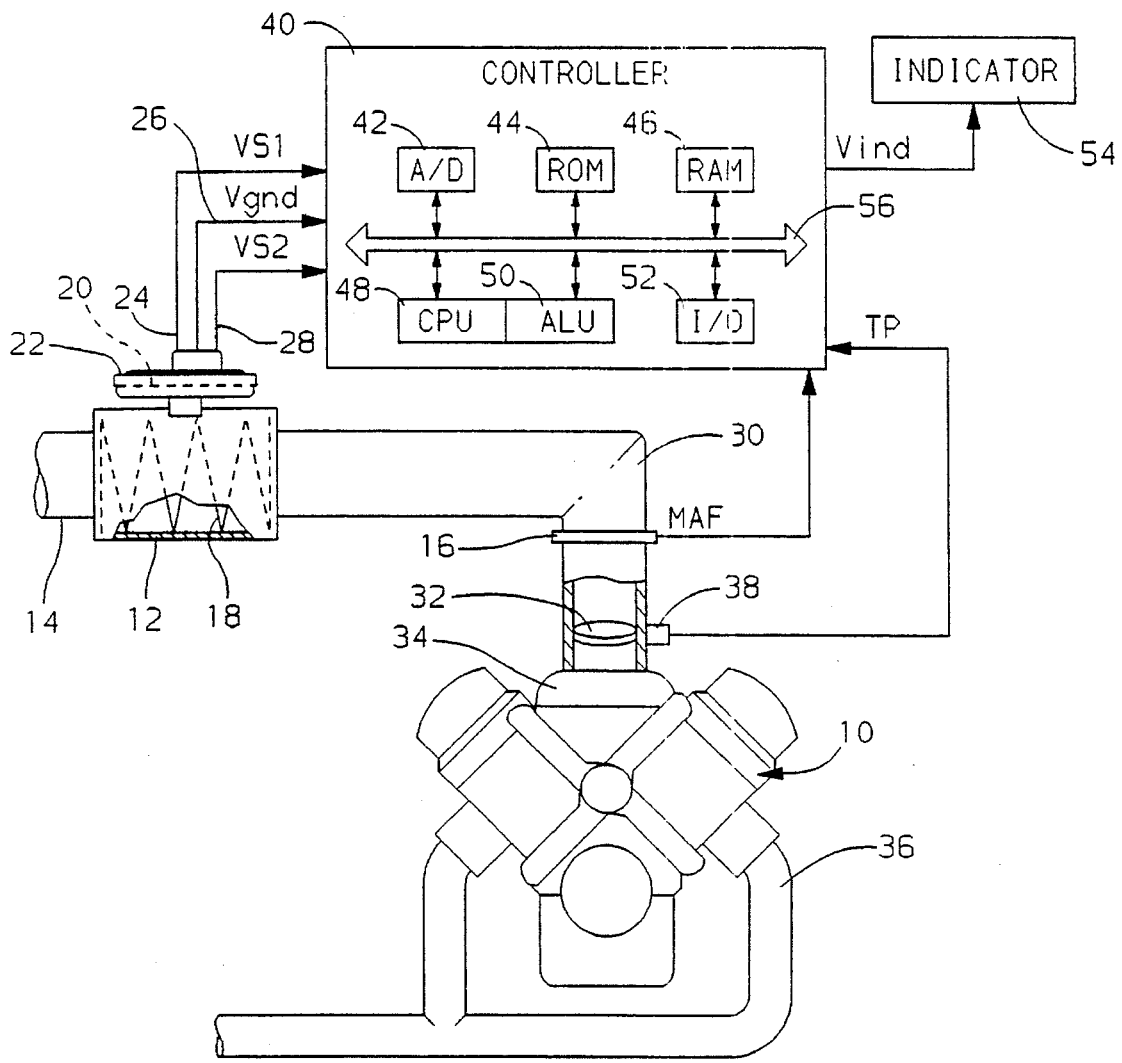
FIG. 1 schematically describes an internal combustion engine and air filter diagnostic hardware of the preferred embodiment.

Referring to FIG. 1, internal combustion engine inlet air is guided to air cleaner 18 in which is disposed a conventional air filter 12, via intake passage 14. The air filter 12 may likewise be of any conventional design for removing contaminants from the intake air. Attached to the air cleaner 18 is a switch assembly 22 in which is disposed a flexible diaphragm 20 which is exposed on a measurement side of the diaphragm to the air pressure at the low side (downstream side) on the air filter, and is exposed to ambient air pressure on a reference pressure side of the diaphragm 20 which opposes the measurement side of the diaphragm. The difference in pressure between ambient pressure and the pressure at a low (downstream) side of the air filter 12 in the air cleaner 18 exerts a force on the diaphragm displacing the diaphragm away from a rest position. The switch assembly includes pressure switches (not shown) positioned to change state when the pressure drop across the diaphragm 20 exceeds at least one predetermined pressure threshold. In this embodiment, two pressure switches are included on the diaphragm, the first set to change state at a predetermined high pressure across the diaphragm, and the second set to change state at a predetermined low pressure across the diaphragm. The output signal of the first switch is provided on electrically conductive lead 24 as signal VS1 and the output signal of the second switch is provided on electrically conductive lead 28 as signal VS2. A ground reference signal Vgnd is provided on a third conductive lead 26.

The intake air passing through air cleaner 18 is received in intake air conduit 30 and passed by a mass airflow meter 16 for transducing the engine intake air mass into representative output signal MAF. The airflow meter 16 may be any conventional airflow meter, such as a conventional hot wire or thick film type air meter generally available in the art. Intake air passing across the mass airflow meter 16 is metered to an engine intake air manifold 34 through a manual or electronic positioning of an intake air valve 32, such as a conventional butterfly or rotary valve, the rotational position of which is transduced by conventional position sensor 38, such as a rotary potentiometer having output signal TP. The air received in the intake manifold 34 is distributed to engine cylinders (not shown) for combustion therein. Combustion gasses exit the cylinders and are guided away from the engine via exhaust gas conduit 36.

A conventional controller is provided for receiving and processing input signal information, such as from signals including MAF, VS1, VS2, TP, and, through execution of a set of control, diagnostic, and maintenance operations, generates and issues control, diagnostic and maintenance signals, such as to provide for engine fuel, air, and ignition control and diagnostics. Such signals include signal Vind in this embodiment issued by controller 40 to an indicator 54, such as a low voltage lamp, light emitting diode, or other conventional visual display device generally known in the automotive field to be used for display of diagnostic information on automotive instrument panels. Alternatively, the visual display may be augmented or supplanted by a tone or other audible alert device. In either case, the visual or audible indicator, or both, is energized through issuance of a drive signal Vind to the indicator 54. The controller issues the energizing signal Vind when it is determined, through execution of a series of diagnostic operations, that the intake air filter 12 is sufficiently restricted through a build-up of contaminants therein to negatively affect engine performance, as will be described.

Controller 40 includes such conventional elements as a central processing unit CPU 48 having arithmetic logic circuitry ALU 50 for performing mathematical and logical operations on data in accord with stored program instructions, and control circuitry for directing various controller elements to perform dedicated functions according to a timing specified in the program instructions or in hardware. The controller 40 further includes random access memory devices RAM 46 including both volatile and nonvolatile devices for data storage functions to support rapid data storage and access operations by the CPU 48 as directed by the control circuitry thereof, and read only memory devices ROM 44 for long term, non-volatile data storage functions to support storage of controller instruction sets, critical data values that are required beyond the vehicle operating cycle in which they were determined, etc. Still further, the controller includes input/output devices I/O 52 for carrying out data transmit and receive operations as directed by the control circuitry of the CPU 48, including sampling of input signals provided to the controller including signals TP, VS1, VS2, and MAF, and for outputting, at times specified by CPU 48, various output drive signals including the signal Vind applied to the indicator 54. Input signal values may be translated into digital equivalents via analog to digital circuitry A/D 42 so as to provide the signal information in a form usable by the controller 40. The controller elements may communicate via a standard data and address bus network 56, as is generally known in the art.

Figure 2:
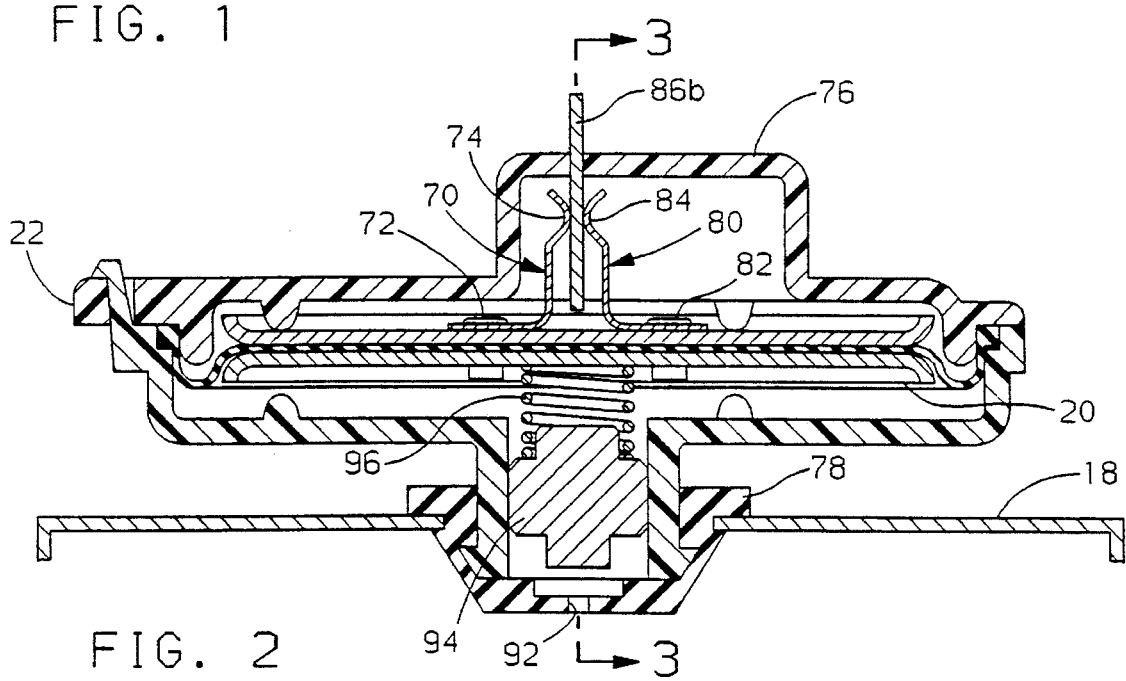
FIG. 2 is an air filter pressure switch diaphragm assembly of the preferred embodiment.

As further detailed in FIG. 2, the switch assembly 22 is mounted on air cleaner 18 via grommet 78 having orifice 92 for translating air pressure within the filter 12 to the measurement side of diaphragm 20 which is upwardly urged within the switch assembly 22 by spring 96 retained by seat 94. The construction of the switch assembly including the grommet 78, spring 96, seat 94, and diaphragm 20 may be any conventional design for translating a pressure difference across air filter 12 into translational displacement of the diaphragm 20 against the retaining force of spring 96. Disposed on the diaphragm 20 is a plurality of electrically conductive contacts, represented by contact 70 and, if desired, electrically redundant contact 80, both of which are retained on diaphragm 20 or a structure (not shown) moving with the diaphragm by any suitable retaining means 72 and 82, respectively, such as a rivet, bolt, screw, or pin. The contacts extend along the direction of displacement of the diaphragm 20 substantially perpendicularly, and are positioned to contact a corresponding plurality of contacts, including contact 86b at contact point 74 of the contact 70 (and at contact point 84 of redundant contactor 80). The contacts 70 and 80 are fixedly associated with the switch assembly 22, such as through attachment to a housing 76 of the switch assembly 22, so that as the diaphragm 20 is displaced in proportion to the pressure drop across the air filter 12, the contact 70 (and 80) is likewise displaced, but the contact, such as contact 86b remains fixed in position relative to the assembly 22 so that the contact 70 (and 80) is displaced along the contact 86b.

Figure 3:
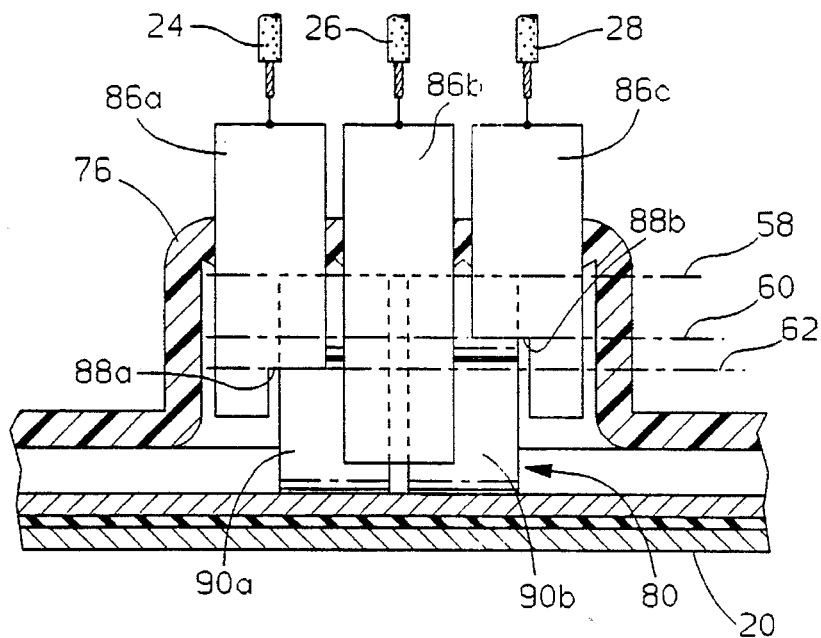
FIG. 3 details an electrical contact portion of the assembly of FIG. 2.

FIG. 3 further details the contact structure of the pressure switch of FIG. 2, taken along view 3—3 of FIG. 2. The contacts 86a, 86b, and 86c are electrically conductive, smooth contacts that are electrically isolated from each other and having conductors 24, 26, and 28, respectively, electrically attached thereto. The contacts represented by element 70 of FIG. 2 are illustrated more fully in the view of FIG. 3 as two electrically conductive smooth fingers 90a and 90b that are electrically isolated from each other. The fingers 90a–90b are slideably displaced along the contacts 86a–86c as the diaphragm 20 is displaced. Finger 90a is in electrical contact with contact 86a and with contact 86b to form an electrical bridge across the contacts 86a and 86b, so that a path of electrical current flow may be provided from contact 86a, across finger 90a to contact 86b. Likewise, finger 90b is in electrical contact with contact 86b and with contact 86c to form an electrical bridge across the contacts 86b and 86c, so that a path of electrical current flow may be provided from contact 86c, across finger 90b to contact 86b. In this embodiment, a ground reference Vgnd is applied to contact 86b via electrical conductor 26. For a minimum pressure drop across the air filter 12, the diaphragm 20 of this embodiment is positioned so that the top of fingers 90a–90b are substantially at the position 58 of FIG. 3. In such position, the ground reference of contact 86b is translated to contacts 86a and 86c, and along the respective conductors 24 and 28. The controller 40 of FIG. 1 is set up to interpret the ground reference at conductors 24 and 28 as indicating the corresponding switches are in a closed state.

As the pressure drop across the air filter 12 increases above the minimum pressure, the fingers 90a–90b move away from position 58 toward the position 60 of FIG. 3. The position 60 corresponds to a calibrated pressure drop across the diaphragm 20, such as about one kPa in this embodiment. When the top of 25 fingers 90a–90b drop below position 60, such as when the pressure drop across the air filter 12 increases above one kPa, the finger 90b will no longer electrically contact the contact 86c due to the cut away portion 88b of the contact 86c substantially along the reference position 60. Therefore when the top of finger 90b moves across position 60, the finger 90b will cross the cut away portion 88b of the contact 86c and the signal on conductor 28 will change state from a state corresponding to a closed switch to a state corresponding to an open switch. The open switch state is indicated by other than a ground reference appearing at the signal VS2 as monitored by controller 40. Accordingly, detection of a pressure drop transition across a calibrated pressure drop is detectable, by sensing a change in state indicated on conductor 28. The finger 90a will remain in electrical contact with contacts 86a and 86b when the top of the fingers 90a–90b cross position 60, as the contact 86a has no cutaway portion along position 60. Rather, contact 86a has a cutaway portion defining a contact end substantially along position 62 of FIG. 3. Position 62 corresponds to a displacement of the diaphragm and of the fingers 90a–90b provided by a pressure drop across the air filter 12, such as a drop calibrated to about 2.5 kPa in this embodiment.

As the pressure drop across the air filter 12 increases above that corresponding to position 60 toward that corresponding to position 62 of FIG. 3, the fingers 90a–90b move away from position 60 toward the position 62. When the top of fingers 90a–90b drop below position 62, such as when the pressure drop across the air filter 12 increases above 2.5 kPa, the finger 90a will no longer electrically contact the contact 86a due to the cut away portion 88a of the contact 86a substantially along the reference position 62. Therefore, when the top of finger 90a moves across position 62, the finger 90a will cross the cut away portion 88a of the contact 86a and the signal on conductor 24 will change state from a state corresponding to a closed switch to a state corresponding to an open switch. Accordingly, detection of a pressure drop transition across a calibrated high pressure drop is detectable, by sensing a change in state indicated on conductor 24. In this embodiment, the controller 40 will detect the pressure drop when the signal VS1 applied thereto switches from a ground reference state to a non-ground reference state.

While the switch assembly 22 of FIG. 3 is provided in this embodiment for sensing a pressure drop transition across each of two pressure drop thresholds, it is recognized that any conventional pressure switch or pressure transducer may be used to determine the change in pressure across the air filter 12 so as to estimate or measure the restrictiveness of the air filter in accord with this invention. For example, air filter restriction information may be provided by transducing the pressure drop across the filter 12 using a conventional analog pressure transducer (not shown) providing a substantially continuous pressure measurement signal which may be received and interpreted by the controller 40, such as through an analog to digital converter input thereof. When the signal indicates a pressure drop exceeding certain calibrated thresholds, action may be taken to verify the air filter condition.

Figure 4A:
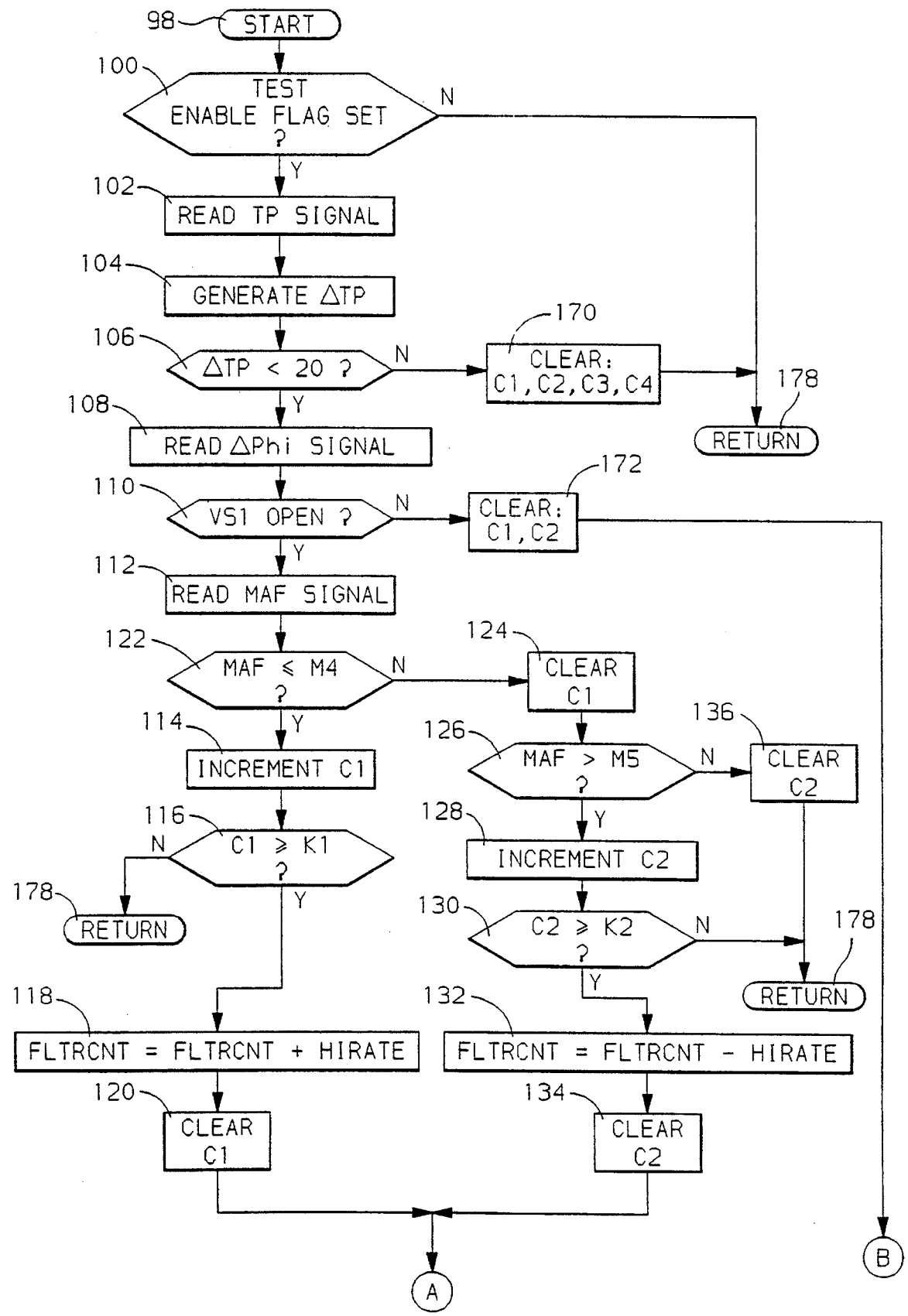
FIG. 4 is a computer flow diagram illustrating a flow of operations of the diagnostic hardware of FIG. 1.
Figure 4B:
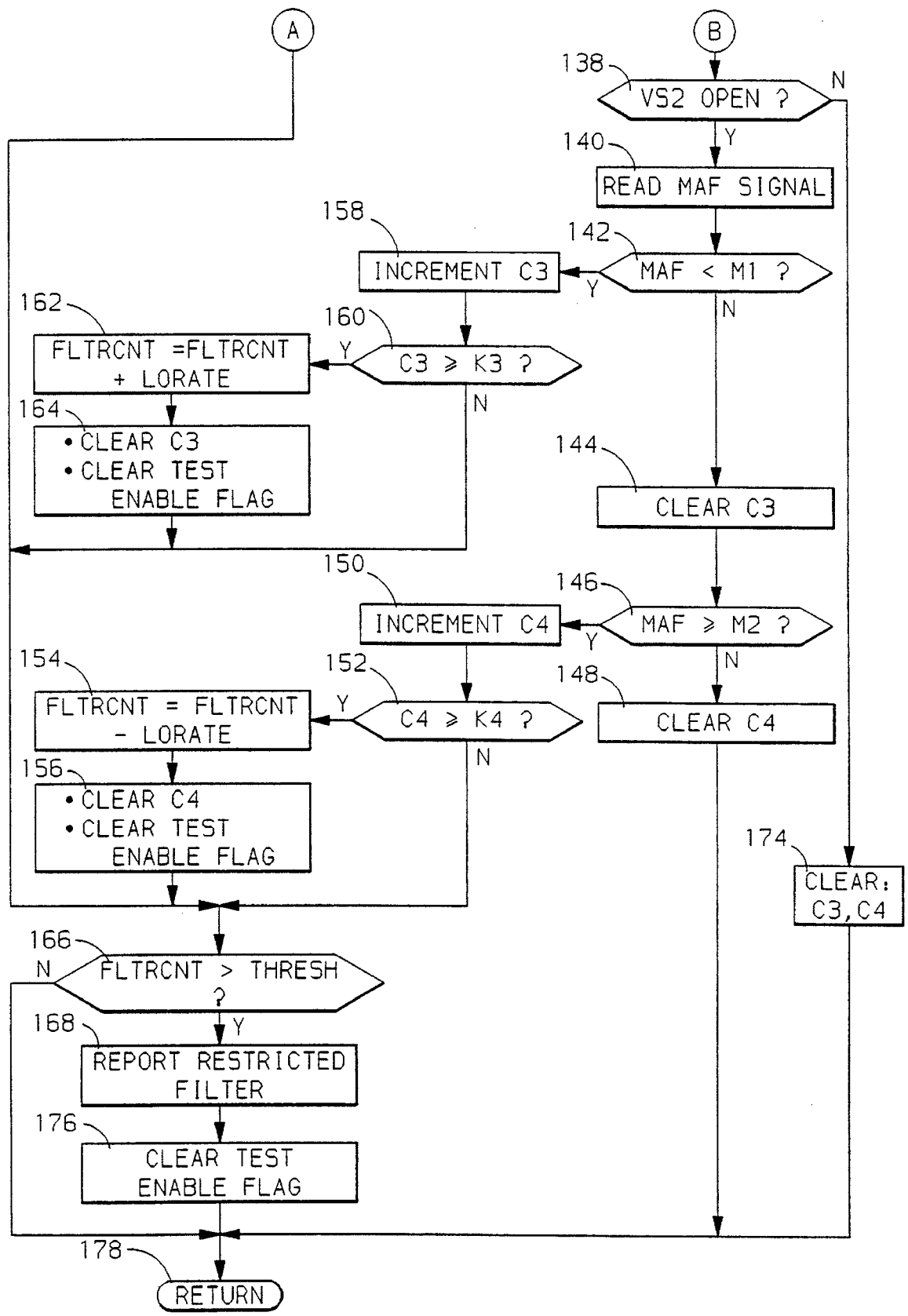

The action taken in this embodiment by the controller 40 of FIG. 1 in response to information received on the pressure drop across the air filter 12, whether via the switch assembly 22 of FIG. 2 or through other known pressure switch or transducer devices as are recognized to be within the scope of this invention, is illustrated through the flow of controller operations of FIG. 4. Such operations may be periodically executed while the controller is operating, such as while ignition power has been manually applied to the controller by an operator of the automotive vehicle in which the hardware of FIG. 1 resides.

In this embodiment, the controller 40 of FIG. 1 is set up to periodically carry out the operations of FIG. 4. For example, such operations may be carried out about every 12.5 milliseconds in response to occurrence of a time-based controller interrupt. Other controller operations, such as providing for conventional engine control, diagnostic and maintenance functions (not shown) may likewise be carried out upon the occurrence of the interrupt.

Turning to the specific diagnostic operations of the present embodiment, such operations are initiated at a step 98 at a predetermined frequency, such as once approximately every 12.5 milliseconds, as described. A next step 100 is then executed to determine the state of a test enable flag. The test enable flag is set automatically by the controller 40 (FIG. 1) at the start of each engine ignition cycle, to provide for air filter analysis through the operations of the routine of FIG. 4. The enable flag is cleared at the conclusion of certain diagnostic activities. If the flag is not set, further air filter test operations are avoided by moving to a step 178 at which the controller 40 is directed to return to any controller operations that were suspended to provide for execution of the routine of FIG. 4. If the test enabled flag is set, the test continues by sampling the current value of the TP signal indicating the current intake air valve angle at a next step 102. A change in throttle position value ΔTP is determined next at a step 104, such as by differentiating the TP signal over a predetermined number of signal samples, or by generating a rate of change in valve position over a predetermined time period, such as a rate of change over the 12.5 millisecond execution period of the routine of FIG. 4.

If ΔTP is less than a calibrated value at a next step 106, then the air filter diagnostic test is continued, as inlet valve position conditions are such that the restriction of the air filter 12 may be reliably estimated. The calibrated value is set to a value between five and seven angular degrees throttle position per 12.5 milliseconds in this embodiment. Rapid changes in inlet air valve position, such as changes exceeding the calibrated value, are typically accompanied by a "manifold filling phenomenon," in which the amount of air taken into the air cleaner 18 increases significantly until the air cleaner is substantially at maximum capacity. Upon reaching maximum capacity, the intake air rate into the cleaner 18 decreases suddenly, resulting in a significant pressure drop across the cleaner 18. Such pressure drop may be indicated by a change in state of one or both switches of FIG. 3, resulting in a false diagnosis of an air filter restriction. To protect against such misdiagnosis, the step 106 only permits continued testing when the valve 32 is substantially positionally stable, that is, is not changing at a rapid time rate.

If the ΔTP exceeds twenty at the step 106, testing is discontinued and prior test data discarded by proceeding to a next step 170 to clear the test values C1, C2, C3, and C4, which values are used for maintaining a count of potential air filter 12 restriction conditions, to be described. After clearing such values, the described step 178 is executed to end the operations of FIG. 4 for the current 12.5 millisecond interrupt.

Returning to step 106, if ΔTP is less than the calibrated value indicating a positionally stable intake air valve 32, the test is continued by reading the status of the pressure switch having a high pressure drop switchpoint, wherein such status is indicated by the level of signal VS1 of FIG. 1. If VS1 indicates an open pressure switch, then the pressure drop across the air filter 12 of FIG. 1 is currently greater than the upper pressure drop threshold calibrated in this embodiment as about 2.5 kPa, as described. If VS1 does not indicate an open pressure switch, then counters C1 and C2 for counting a number of consecutive open pressure switch-based potential restriction conditions, to be described, are cleared at a next step 172, and the status of the pressure switch having the low pressure drop switchpoint is read at a step 138. Such switch status is indicated as switch assembly output signal VS2, as described. If VS2 does not indicate an open switch condition, then the pressure drop across the air 25 filter 12 of FIG. 1 is less than even the low pressure threshold of about one kPa, indicating no significant current air filter restriction. The counters C3 and C4 for counting consecutive low pressure drop-base potential restriction conditions of the filter, to be described, are therefore cleared at a next step 174, and the routine is then concluded by proceeding to the described step 178.

Returning to the step 138, if signal VS2 indicates an open switch, the pressure drop across the air filter 12 is currently sensed to be greater than one kPa. To properly interpret the relationship of such a pressure drop with air filter restriction, the airflow rate through the air cleaner 18 must be characterized. Pressure drop across an air filter of a fixed level of restriction may vary significantly as a function of airflow rate through the filter 12. If a significant pressure drop is present for a low airflow rate, the filter may be assumed to be significantly restricted, while the same pressure drop for a high airflow rate may indicate a substantially unrestricted air filter.

Figure 5:
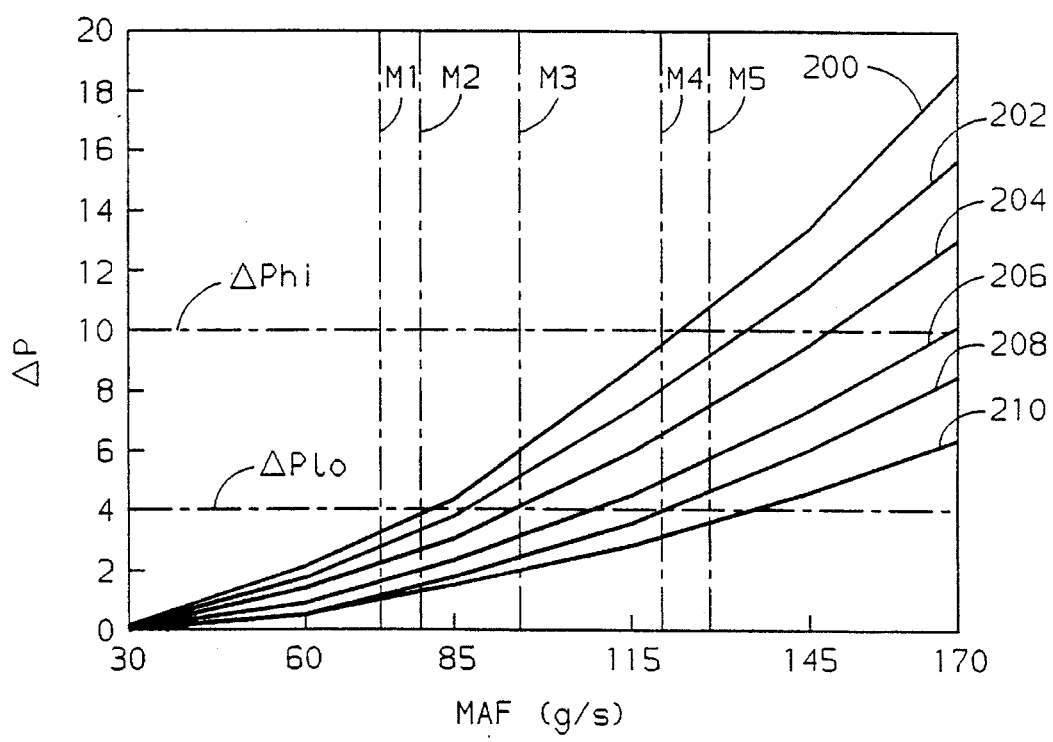
FIG. 5 is a graphical description of the change in pressure across a plurality of intake air filters having varying states of restriction as a function of intake airflow.

FIG. 5 illustrates a relationship between airflow rate (MAF) and pressure drop $\Delta P$ across an air filter. The family of curves 200–210 illustrates how this relationship can vary with varying air filter restriction. For a filter having minimum restriction, curve 210 illustrates that even significant pressure drop can occur at high airflow rates, such as rates above 100 grams per second. Curve 200 illustrates the relationship for a filter having an extreme amount of restriction. Curve 202 has a slightly lower restriction than that represented by curve 200, while curve 204 has even less than that of 202, etc. The high and low pressure drop thresholds $\Delta PHi$ and $\Delta Plo$ of 2.5 and one kPa, respectively, are included in FIG. 5 to illustrate that a crossing of such thresholds does not necessarily indicate a significant amount of air filter restriction, due to the influence of airflow rate on $\Delta P$. As airflow rate increases, a more accurate assessment of the air filter restriction may be provided as indicated by the separation of curves 200–210 at higher airflow rates. A low restriction condition is less likely to be diagnosed as a higher restriction condition, for example, as a greater pressure drop exists between the same two restriction 5 conditions at higher airflow rates. At low airflow rates, such as rates less than M1, the relationship between a measured pressure drop and a corresponding air filter restriction is more likely to be mischaracterized than at the high airflow rates, as the difference in pressure drop between even significantly different restriction conditions is relatively small, as illustrated by the close magnitude relationship between the family of curves 200–210 at low airflow rates. Nonetheless, so that air filter restriction may be diagnosed at even low airflow rates in accord with an important aspect of this invention, analysis of the pressure drop across the filter 12 of FIG. 1 is provided using the threshold $\Delta Plo$. Additionally, to retain the benefits associated with pressure drop analysis at higher airflow rates, the additional pressure drop threshold $\Delta Phi$ is included in the analysis, to be described.

Further, airflow rate boundaries M1–M5 are provided to define a number of airflow regions used to characterize any detected pressure drop across the air filter 12. For example, if the pressure drop is determined to be between $\Delta Plo$ and $\Delta PHi$, and the current airflow rate is in the region above rate M2, the air filter is characterized as having low restriction. For the same pressure drop, if the mass airflow is less than M1 however, the air filter is characterized as highly restricted. In this embodiment, M1–M5 are calibrated as follows:

| BOUNDARY | MASS AIRFLOW RATE (g/s) |
| --- | --- |
| M1 | 74.8 |
| M2 | 79 |
| M3 | 95.8 |
| M4 | 120.3 |
| M5 | 125.6 |

It is recognized that in alternative embodiments of this invention, additional boundaries, or fewer boundaries may be used to characterize the pressure drop as a function of mass airflow, and indeed it is recognized that a function may be defined that provides for a continuous characterization of the restriction of the air filter as a function of both mass airflow rate and pressure drop, for example using fuzzy logic techniques. For example, a membership function may be defined wherein the degree of membership corresponds to the mass airflow rate, and wherein a weighting function for weighting the measured pressure drop is provided from the membership function to yield a continuous value having a magnitude corresponding to the degree of restriction of the air filter 12. The continuous value may be provided to indicate the evolving restriction of the air filter, or an indication that a restriction condition exists may be provided when the continuous value is determined to have exceeded a calibrated or an adaptive threshold value.

Returning to FIG. 4, if VS2 is determined to be open at the step 138, the current mass airflow rate indicated by signal MAF is determined at a next step 140. If MAF is less than M1, as determined at a next step 142, then a restricted air filter 12 is assumed to be present, due to the low mass airflow rate. TO maintain a history of such a condition, a counter C3 stored in RAM 46 of FIG. 1 is incremented to record 25 the detected restriction at a next step 158. If C3 exceeds or is equal to a calibrated threshold value K3 as determined at a next step 160, wherein K3 is calibrated to a value of four in this embodiment, then the restriction condition has been present for four consecutive iterations of the routine of FIG. 4, such that it may be assumed the detected restriction was due to a sensor or a signal transient condition truly indicating air filter restriction. A counter FLTRCNT indicating the number of assumed valid restriction conditions is next increased in accord with a calibration value LORATE, set to about one in this embodiment. FLTRCNT may be stored in a non-volatile portion of RAM 46 so as to be preserved from engine ignition cycle to engine ignition cycle. The counter C3 and the test enable flag are next cleared at a step 164. Counter C3 is cleared to prepare for subsequent diagnostic operations. The test enable flag is cleared to prevent more than one adjustment of the FLTRCNT value based on a transition of the low pressure switch for each ignition cycle, to reduce the potential for inaccurate indications of filter restriction conditions, due to the relatively low restriction detection accuracy at lower airflow rates. Next, or if C3 is less than K3 as determined at the step 160, then FLTRCNT is compared to a calibrated threshold THRESH at a step 166. If FLTRCNT exceeds THRESH, the number of detected valid restriction conditions is great enough that a significantly restricted filter is assumed to be present that, pursuant to high engine performance standards, must be replaced for satisfactory engine operation. An indication of the restriction is therefore made at a next step 168, such as by setting output signal Vind to a level corresponding to energization of the indicator 54 of FIG. 1. The test enable flag is next cleared at a step 176 to prevent execution of the operations of FIG. 4 until the next vehicle ignition cycle. For example, the test enable flag is automatically set once each time a vehicle operation manually applies ignition power to the controller. Once a diagnosis of restriction is made, or following an adjustment of FLTRCNT in response to a transition of the low pressure switch, the flag is cleared to free up the controller 40 to efficiently provide for other operations, such as the carrying out of conventional vehicle control, diagnostic and maintenance functions. After clearing the flag at the step 176, the described step 178 is executed.

Returning to the step 142, if MAF is not less than M1, C3 is cleared at a next step 144 and MAF is compared to boundary M2 at a next step 146. M2 is calibrated as an airflow rate boundary, wherein for airflow rates at or exceeding M2, a pressure drop across the air filter 12 (FIG. 1) of between one and 2.5 kPa is associated with a substantially unrestricted air filter. Accordingly, if MAF equals or exceeds M2 as determined at the step 146, a counter C4 is incremented at a next step 150 to log the low restriction condition. If such a low restriction condition is detected for K4 consecutive iterations of the operations of FIG. 4, as determined at a next step 152, then the counter FLTRCNT for maintaining a count of viable air filter restriction conditions is reduced at a next step 154 by the amount LORATE, corresponding to unity in this embodiment. The value K4 is set to four in this embodiment, to reduced the sensitivity of the diagnostic to pressure or airflow transients. In other words, only pressure drop or airflow conditions that persist for four consecutive iterations of the diagnostic operations of FIG. 4 will affect the filter restriction counter FLTRCNT. After increasing FLTRCNT, the counter C4 and the test enable flag are cleared at a next step 156. The counter C4 is cleared to prepare for subsequent test iterations. The test enable flag is cleared to prevent more than one adjustment of FLTRCNT based on a low pressure switch transition for each ignition cycle in this embodiment, to reduce the potential for an inaccurate indication of a filter restriction condition. Next, or if C4 was not greater than or equal to K4 at the step 152, the described step 166 is executed.

Returning to the step 146, if MAF is determined to be less than M2, such that MAF is currently between M1 and M2, the combination of the current pressure drop across the air filter and the airflow MAF is indeterminate for air filter restriction diagnostics. Accordingly, the counter C4 is cleared at a next step 148 to prepare for subsequent diagnostic analyses, and the described step 178 is next executed.

Referring again to the step 110, if VS1 indicates the high pressure drop switch is in an open state indicating a pressure drop across the air filter 12 of greater than 2.5 kPa in this embodiment, then the pressure drop is interpreted by analyzing the mass airflow rate through the filter 12 corresponding to the pressure drop. If the airflow rate is high enough that a substantially unrestricted filter may have such a pressure drop, no restriction condition is present. If the airflow rate is not high, then a restriction is likely to be present.

Specifically, if VS1 indicates an open switch condition at the step 110, the MAF signal is read at a next step 112 and compared to a calibrated airflow boundary M4 at a next step 122. M4 is calibrated, for the present embodiment, to be about 120 grams per second, as described. The calibration of M4 involves establishing for the hardware of FIG. 1, the upper bound of a range of airflow rates for which a highly restricted air filter will have a pressure drop thereacross of at least 2.5 kPa.

If MAF is less than or equal to M4 at the step 122, an airflow restriction condition is therefore detected, and a counter C1 is incremented at a next step 114 to record the restriction condition. If K1 of such conditions are consecutively recorded as determined at a next step 116, a viable air filter restriction condition is assumed to be present due to the persistence of the condition, wherein K1 is calibrated to about four in this embodiment, and the air filter restriction counter FLTRCNT is increased by a calibrated value HIRATE at a next step 118. HIRATE is set to five in this embodiment, due to the reliable air filter restriction information that becomes 0 available at higher airflow rates. The value LORATE, which was described to be set to one in this embodiment, and which is applied to FLTRCNT for restriction conditions determined to be present or absent at relatively low airflow rates, reflects the 5 reliability of restriction diagnosis at such lower airflow rates, as described. After updating FLTRCNT at the step 118, counter C1 is cleared at a next step 120, and the described step 166 is next executed to determine in FLTRCNT is of sufficient magnitude to require an indication of a filter restriction condition. Alternatively, if C1 is less than K1 at the step 116, more airflow and pressure drop information, from subsequent iterations of the current diagnostic operations, is required to confirm the restriction condition, and the routine is concluded by proceeding to the described step 178.

Returning to the step 122, if MAF is greater than M4, the counter C1 is cleared at a next step 124, to prepare for the next iteration of the routine of FIG. 4, and MAF is next compared to M5 at a step 126. M5 is a calibrated airflow rate boundary established through a calibration process to define a range of airflow rates at and above M5 that correspond to an expected airflow rate through a substantially unrestricted air filter across which a pressure drop equals or exceeds 2.5 kPa. IF MAF is less than or equal to M5 at the step 126, then MAF is between M4 and M5 which is an airflow region in which the pressure drop of at least 2.5 kPa is indeterminate for air filter restriction diagnostics. Accordingly, diagnostic operations are suspended by proceeding to clear counter C2 at a next step 136 to prepare for subsequent diagnostic operations, and then proceeding to the described step 178. Alternatively, if MAF is greater than M5 at the step 126, there is no detected air filter restriction and a counter C2 is next incremented to record the no restriction condition at a step 128. If C2 equals or exceeds a calibrated count threshold K2 at a next step 130, then the no restriction condition has persisted for a sufficient amount of time that the condition is assumed to be associated with more than a mere high pressure drop transient or a high airflow transient. A next step 132 is therefore executed when C2 equals or exceeds K2 at the step 130, to decrease FLTRCNT by the amount HIRATE. HIRATE is set to five in this embodiment corresponding to the increased diagnostic reliability associated with filter diagnostics at high airflow rates, as described. The counter C2 is next cleared at a step 134 to prepare for subsequent diagnostic operations, and then the described step 166 is executed. Returning to the step 130, if C2 is less than K2, the no restriction condition is not yet confirmed. Further pressure and airflow analysis is therefore required in a subsequent iteration of the operations of FIG. 4. Accordingly, the described step 178 is executed to conclude the current iteration of the operations of FIG. 4.

The preferred embodiment for the purpose of explaining this invention is not to be taken as limiting or restricting this invention since many modifications may be made through the exercise of ordinary skill in the art without departing from the scope of the invention.

The embodiments of the invention in which a property or privilege is claimed are described as follows:

1. A method for diagnosing deterioration of an internal combustion engine intake air filter, the deterioration characterized by significant airflow restriction across the intake air filter, comprising the steps of:
   defining a minimum degree of airflow restriction across the intake air filter corresponding to a deteriorated intake air filter;
   generating a schedule of pressure drop values across a sample air filter having the established minimum degree of airflow restriction, as a function of airflow through the sample air filter;
   sensing pressure drop across the intake air filter;
   sensing airflow through the intake air filter;
   referencing the pressure drop value corresponding to the sensed airflow, from the schedule of pressure drop values;
   comparing the referenced pressure drop value to the sensed pressure drop; and
   diagnosing a deteriorated intake air filter when the sensed pressure drop exceeds the referenced pressure drop value.

2. The method of claim 1, further comprising the steps of:
   sensing a present value of at least one engine operating parameter indicating an engine operating condition; and
   determining whether the engine operating condition indicated by the sensed present value is a predetermined steady state engine operating condition; and
   wherein the diagnosing step diagnoses a deteriorated intake air filter when the sensed pressure drop exceeds the referenced pressure drop value while the engine operating condition is the predetermined steady state engine operating condition.

3. The method of claim 1, further comprising the steps of:
   increasing a counter by a predetermined increase amount when the sensed pressure drop exceeds the referenced pressure drop value;
   decreasing the counter by a predetermined decrease amount when the sensed pressure drop does not exceed the referenced pressure drop value; and
   comparing the counter to a predetermined counter threshold; and wherein the diagnosing step diagnoses a deteriorated intake air filter when the counter exceeds a predetermined counter threshold.

4. The method of claim 3, further comprising the steps of:
   varying the predetermined increase amount as a predetermined function of the sensed airflow; and
   varying the predetermined decrease amount as a predetermined function of the sensed airflow.

5. An apparatus for diagnosing a deteriorated automotive internal combustion engine intake air filter, comprising:
   a memory device for storing a schedule of minimum pressure drop values across a deteriorated air filter as a function of corresponding airflow rate through the air filter, wherein the minimum pressure drop values of the schedule are substantially the minimum pressure drop across a deteriorated air filter through which engine intake air is passing at the corresponding airflow rate;
   a pressure sensor for sensing an intake air pressure drop across the air filter;
   an airflow sensor for sensing airflow rate through the air filter when the intake air pressure drop is sensed;
   referencing means for referencing a pressure drop value as a function of the sensed airflow rate;
   comparing means for comparing the sensed intake air pressure drop to the referenced pressure drop value; and
   determining means for determining that the air filter is deteriorated when the sensed intake air pressure drop exceeds the referenced pressure drop value.

6. The apparatus of claim 5, further comprising:
   a memory device for storing a counter value;
   means for increasing the counter value by a predetermined increase amount when the sensed intake air pressure drop exceeds the referenced pressure drop value;
   means for decreasing the counter value by a predetermined decrease amount when the sensed intake air pressure drop does not exceed the referenced pressure drop value; and
   means for comparing the counter value with a predetermined count threshold value; and wherein the determining means determines that the air filter is deteriorated when the counter value exceeds the predetermined count threshold value.

7. The apparatus of claim 6, further comprising:
   means for adapting the magnitude of the predetermined increase amount and the magnitude of the predetermined decrease amount as a predetermined function of the sensed airflow rate.

8. The apparatus of claim 5, wherein the referencing means comprises central processing unit control circuitry.

9. The apparatus of claim 5, wherein the comparing means comprises an arithmetic logic unit.

10. The apparatus of claim 5, wherein the determining means comprises a central processing unit and an arithmetic logic unit.

11. A method for diagnosing a deterioration condition characterized by a significant increase in airflow restriction across an automotive air cleaner, comprising the steps of:
   storing a schedule of minimum pressure drop values across a deteriorated air cleaner as a function of airflow rate through the air cleaner, wherein the minimum pressure drop values of the schedule correspond to the minimum pressure drop across a deteriorated air cleaner through which engine intake air is passing at the corresponding airflow rate; repeating, while the engine is operating to draw intake air across the air cleaner, the steps of:
   sensing an air pressure drop across the air cleaner;
   sensing airflow rate through the air cleaner when the intake air pressure drop is sensed;
   referencing a minimum pressure drop value as a function of the sensed airflow rate, from the stored schedule;
   comparing the sensed air pressure drop to the referenced minimum pressure drop value; and diagnosing the deterioration condition when the sensed air pressure drop exceeds the referenced minimum pressure drop value.

12. The method of claim 11, further comprising, while the engine is operating to draw intake air across the air cleaner, the repeated steps of:

increasing a counter by a predetermined increase amount when the sensed air pressure drop exceeds the referenced minimum pressure drop value; and decreasing the counter by a predetermined decrease amount when the sensed air pressure drop does not exceed the referenced minimum pressure drop value; and comparing the counter to a predetermined count threshold value; and wherein the diagnosing step diagnoses the deterioration condition when the counter exceeds the predetermined count threshold value.

13. The method of claim 12, further comprising the steps of:

varying the predetermined increase amount as a predetermined function of the sensed airflow rate; and varying the predetermined decrease amount as a predetermined function of the sensed airflow rate.

* * * * *